United States Patent [19]

Nishizawa et al.

[11] Patent Number: 4,841,369

[45] Date of Patent: Jun. 20, 1989

[54] SOLID STATE IMAGING DEVICE WITH AN ARRANGEMENT FOR PROVIDING A HIGH SPEED SCAN OR OMITTING SCANNING IN AN UNNECESSARY PICK-UP RANGE

[76] Inventors: Shigeki Nishizawa, 3ku-27gou, 3550 Hayano, Mobara-shi, Chiba-ken; Iwao Takemoto, 1221-6 Hayano, Mobara-shi, Chiba-ken; Toshio Miyazawa, 853-27 Ariyoshicyou, Chiba-shi, Chiba-ken; Tetsurou Izawa, 3550 Hayano, Mobara-shi, Chiba-ken, all of Japan

[21] Appl. No.: 69,178

[22] Filed: Jul. 2, 1987

[51] Int. Cl.⁴ ............................................. H04N 5/335
[52] U.S. Cl. ............................ 358/213.26; 358/213.23
[58] Field of Search ....................... 358/213.26, 213.23, 358/183

[56] References Cited

U.S. PATENT DOCUMENTS

| | | |
|---|---|---|
| 4,002,824 | 1/1977 | Petrocelli et al. .............. 358/213.13 |
| 4,644,405 | 2/1987 | Roy et al. ........................ 358/213.26 |
| 4,689,686 | 8/1987 | Hashimoto et al. ............. 358/213.26 |

Primary Examiner—James J. Groody
Assistant Examiner—Robert M. Bauer
Attorney, Agent, or Firm—Antonelli, Terry & Wands

[57] ABSTRACT

A solid-state imaging system is provided with a vertical and/or horizontal window function, in which vertical and/or horizontal scanning corresponding to an unnecessary pick-up range of a camera subject (hatched portions of FIG. 8) is done with a high rate or omitted by driving with high frequency or resetting a vertical and-/or a horizontal scanning register.

4 Claims, 7 Drawing Sheets

SOLID STATE IMAGING DEVICE WITH AN ARRANGEMENT FOR PROVIDING A HIGH SPEED SCAN OR OMITTING SCANNING IN AN UNNECESSARY PICK-UP RANGE

BACKGROUND OF THE INVENTION

1. Field of the Invention

The present invention generally relates to a solid state image pickup apparatus, and particularly relates to a technique effectively applicable to a solid state image pickup apparatus, for example, of the type in which a picture signal formed by a photoelectric conversion element is taken out on the basis of a selection signal formed by a horizontal and a vertical shift register.

2. Description of the Prior Art

Solid state image pickup devices constituted by a combination of photo-diodes and switch MOS FETs are well known. One example of such a solid state image pickup apparatus is described for example, in Japanese Patent Unexamined Publication No. 59-63892(1984).

The inventors of this application have thought the use of the foregoing solid state image pickup apparatus for recognition of patterns such as characters, marks, figures, and the like. The foregoing solid state image pickup apparatus, however, has been developed mainly as a camera for a television. Therefore, this apparatus suffers from an inconvenience that a full picture signal for a television screen is produced to thereby spoil a high-speed operation even when pattern recognition is performed within a relatively narrow range. In other words, a high-speed operation cannot be performed in spite of the fact that only a narrow range is involved. Therefore, it is considered that a solid state image pickup apparatus should be designed which is exclusive to pattern recognition within a relatively narrow range. Accordingly, it may be considered to develop such solid state image pickup apparatus for exclusive use. However, in view of the variety of use typically envisioned for pickup devices, the solid state image pickup apparatus for exclusive are grouped into many kinds, each in small quantities, resulting in an increase in cost for development as well as for manufacture.

SUMMARY OF THE INVENTION

It is therefore an object of the present invention to eliminate the foregoing disadvantages in the prior art.

It is another object of the present invention to provide a solid state image pickup apparatus having a new function and increased flexibility.

To attain the above objects, according to an aspect of the present invention, the solid state image pickup apparatus comprises a picture element array including photoelectric conversion elements arranged in a matrix, a horizontal and a vertical shift register for reading signals from the photoelectric conversion elements, and a change-over circuit for supplying the vertical shift register with a clock signal. This clock signal will have a high frequency when a read operation is performed with respect to lines to be disused among signal read lines respectively corresponding to outputs of the vertical shift register to thereby substantially omit scanning of the disused lines.

Preferably the apparatus further comprises a counter circuit to which the lines to be disused are set. In conjunction with this the change-over circuit is arranged to cooperate with the counter circuit so as to stop supply of a horizonal clock signal to the horizontal shift register in response to an output signal of the counter circuit and so as to change-over the supply of the horizontal clock signal to thereby supply the horizontal clock signal to the vertical shift register.

BRIEF DESCRIPTION OF THE DRAWINGS

The above and other objects, and novel feature of the present invention will be apparent from the following disclosure taken in conjunction with the accompanying drawings; in which.

DETAILED DESCRIPTION OF THE PREFERRED EMBODIMENTS

Embodiment 1

Figure 1:
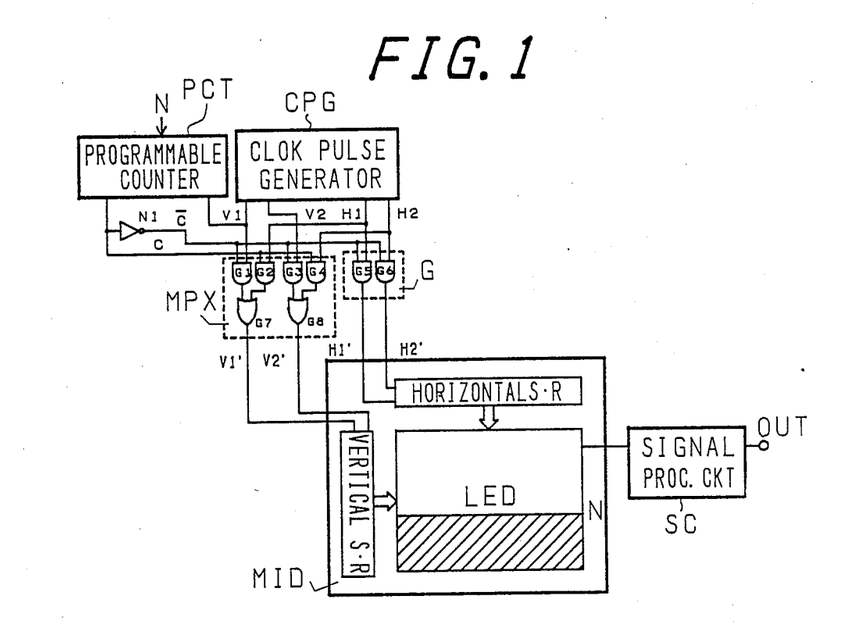
FIG. 1 is a block diagram showing an embodiment of the solid state image pickup apparatus according to the present invention.

FIG. 1 is a block diagram showing an embodiment of the solid state image pickup apparatus according to the present invention.

A solid state image pickup circuit MID is constituted by vertical and horizontal shift registers VSR and HSR for forming vertical and horizontal scanning signals respectively, and a picture element array LED having a matrix arrangement provided with photo-diodes and switch MOS FETs switch-controlled on the basis of the vertical and horizontal scanning signals. A known solid state image pickup circuit for a television, which has been disclosed in the foregoing prior art reference, or the like, may be utilized as it is as the solid state image pickup circuit MID, although the invention is not necessarily limited to this.

In this embodiment, in order to make it possible to apply the solid state image pickup circuit MID to an apparatus for recognizing patterns such as characters, figures, and the like, a clock generation circuit CPG, a program counter circuit PCT, a multiplexer MPX, a gate circuit G, etc., are provided in addition to the solid state image pickup circuit MID.

The clock generation circuit CPG is arranged to generate vertical clock signalss V1 and V2, and horizontal clock signals H1 and H2 to be supplied respectively to the vertical and horizontal shift registers VSR and HSR provided for a television.

The program counter circuit PCT is arranged to receive the number of valid lines N as an initial value to thereby perform an operation for counting the vertical clock signal V1. Having counted the number of initially set valid lines N by this counting operation, the program counter circuit PCT produces a change-over control signal C. The control signal C and the complement control signal c̄ obtained by inverting the control signal C by an inverter circuit N1 are used for controlling the multiplexer MPX and the gate circuit G.

In the multiplexer MPX, the vertical clock signals V1 and V2 and the horizontal clock signals H1 and H2 supplied from the clock generation circuit CPG are changed-over in accordance with the control signals C and c̄ so that clock signals V1' and V2' are applied to the vertical shift register VSR of the solid state image pickup circuit MID. Specifically, the multiplexer MPX is constituted by AND gates G1, G2, G3 and G4 and OR gates G7 and G8. The respective outputs of the AND gates G1 and G2 are respectively connected to the two inputs of the OR gate G7 and the respective outputs of the AND gates G3, and G4 are respectively connected to the two inputs of the OR gate G8. The inverted control signal c̄ and the vertical clock signal V1 are respectively supplied to the two inputs of the AND gate G1, and the non-inverted control signal C and the horizontal clock signal H1 are respectively supplied to the AND gate G2 provided in a pair with the AND gate G1. The respective output signals from the AND gates G1 and G2 are supplied to the OR gate G7 so that the output signal of the OR gate G7 is applied to the vertical shift register VSR as the clock signal V1'. The inverted control signal c̄ and the vertical clock signal V2 are respectively supplied to the two inputs of the AND gate G3, and the non-inverted control signal C and the horizontal clock signal H2 are respectively supplied to the two inputs of the AND gate G4 provide in a pair with the AND gate circuit G3. The respective output signals from the AND gates G3 and G4 are respectively supplied to the two inputs of the OR gate G8 so that the output signal of the OR gate G8 is supplied to the vertical shift register VSR as the clock signal V2'.

The gate circuit G is constituted by AND gates G5 and G6. The inverted control signal c̄ and the horizontal clock signal H1 are respectively supplied to the two inputs of the AND gate 5, and the inverted control signal c̄ and the horizontal clock signal H2 are respectively supplied to the AND gate G6. The respective output signals of the AND gates G5 and G6 are supplied as the clock signals H1' and H2' to the horizontal shift register HSR.

Being not specifically limited, in the case where the solid state image pickup circuit MID is constituted by a single semiconductor integrated circuit device, the program counter circuit PCT, the multiplex MPX, and the gate circuit G may be incorporated in the semiconductor integrated circuit constituting the solid state image pickup circuit MID.

A picture signal obtained from the solid state image pickup circuit MID is supplied to a signal processing circuit SC in which false signals resulting from smears, blooming, or the like, and sampling clock components corresponding to the horizontal clock signal are removed.

Figure 2:
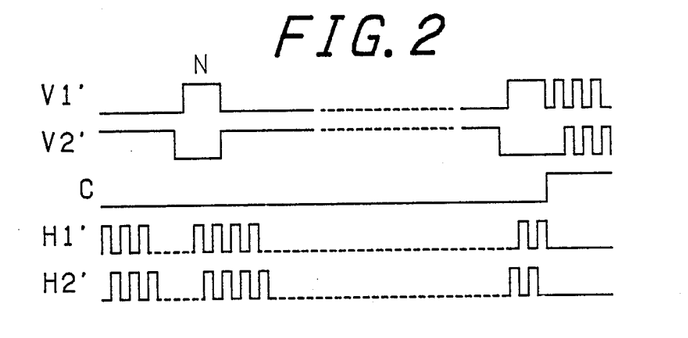
FIG. 2 is a timing chart for explaining an example of the operation of the solid state image pickup apparatus of FIG. 1.

FIG. 2 is a timing chart for explaining an example of the operation of the solid state image pickup apparatus of the embodiment.

During a period in which the count of the program counter circuit PCT is smaller than the set value N thereof, the control signal C is made "Low" (logic "0"), and therefore the inverted control signal c̄ is made "High" (logic "1"). As a result, the AND gates G1 and G3 of the multiplexer MPX are opened so that the clock signals V1 and V2 of a relatively low frequency formed by the clock generation circuit CPG are passed therethrough so as to be supplied as the respective clock signals V1' and V2' to the vertical shift register VSR. At this time, the AND gates G5 and G6 are opened by the inverted control signal c̄ of "High" so that the horizontal clock signals H1 and H2 of a high frequency are passed therethrough so as to be supplied as the clock signals H1' and H2' to the horizontal shift register HSR. Therefore, a picture signal on each line of the picture element array LED corresponding to the count of the program counter circuit PCT is successively produced in synchronism with the horizontal clock signal H1' till the count of the program counter circuit PCT reaches the set value N thereof.

When the count of the program counter circuit PCT becomes larger than the set value N, the control signal C is changed over to be "High" (logic "1") and therefore the inverted control signal c̄ is changed over to be "Low" (logic "0"). As a result, the AND gates G2 and G4 of the multiplexer MPX are opened so that the high-frequency horizontal clock signals H1 and H2 from the clock generation circuit CPG are passed therethrough so as to be supplied as the clock signals V1' and V2' to the vertical shift register VSR. At this time, the AND gates G5 and G6 are closed by the inverted control signal c̄ of "Low" so that the respective outputs to thereby make the horizontal shift register HSR stop its shift operation. That is, the horizontal shift register HSR is put in the reset state after completion of the shift operation for one line. As a result, all the horizontal switch MOS FETs are turned off, so that the read operation of the photo-diodes is put in the stopped state. Thus, the reading operation beyond the N-th line is stopped. The scanning for the remainder lines is performed by the vertical shift register VSR at a high speed on the basis of the high-frequency clock signals V1' and V2' (that is, H1 and H2).

As a result, for example, the reading operation at the hatched portion beyond the N-th line in the picture element array LEC of FIG. 1 is made invalid to thereby shorten the scanning time correspondingly. Thus, it is made possible to perform the repetitive reading operation for the valid lines at a high speed. That is, the horizontal clock signals H1 and H2 made to have a frequency, for example, of about 7MHz, higher than that (15.7KHz) of the vertical clock signals V1 and V2, so that the scanning of the invalid lines can be instantaneously completed, and moreover it is not necessary to use a special clock signal.

Figure 3:
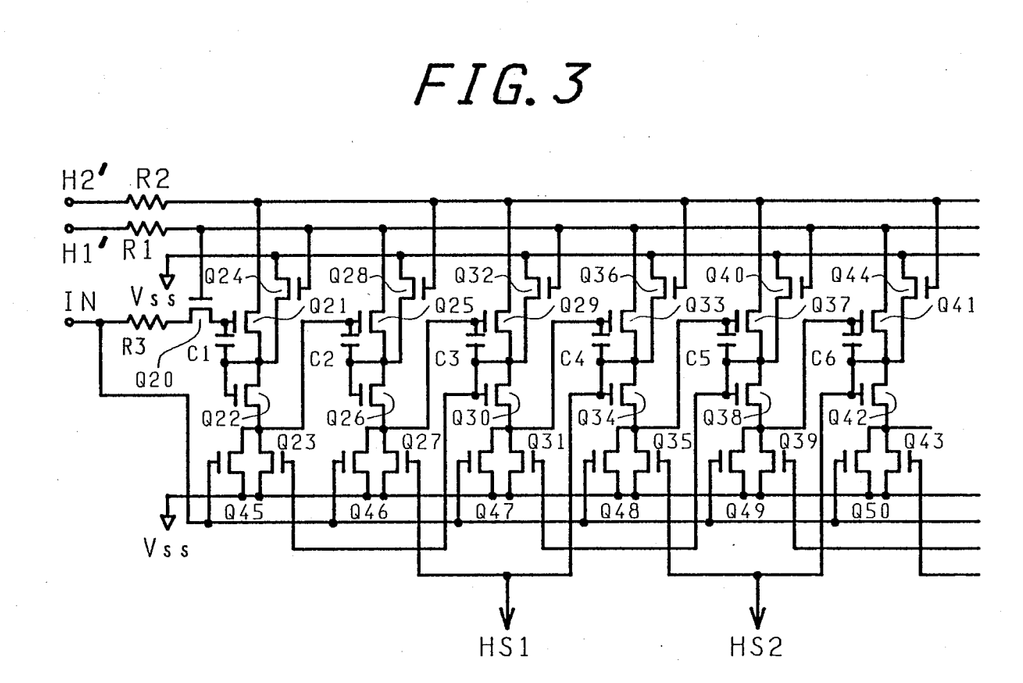
FIG. 3 is a circuit diagram showing an embodiment of the horizontal shift register (or the vertical shift register) of the embodiment of FIG. 1.

FIG. 3 is a circuit diagram specifically showing an embodiment of the horizontal shift register HSR (or the vertical shift register VSR).

A half-bit circuit in the preceding stage constituting the horizontal shift register HSR is constituted by the following circuit elements. An input signal is supplied to a gate of an input MOS FET Q21 which is supplied at its drain with the shift clock signal H2'. A diode-connection MOS FET Q22 is connected at its drain (anode side) to the source of the MOS FET Q21 so as to transfer the output from the source of the MOS FET Q21. An MOS FET Q23 is connected between the source (cathode side) of the diode-connection MOS FET Q22 and an earth potential Vss of the circuit, so as to receive an output signal from a circuit in the succeeding state by one bit after. An MOS FET Q24 is connected between the source of the input MOS FET Q21 and the earth potential Vss of the circuit so as to receive the shift clock signal H1'. An initial signal IN is supplied to the gate of the input MOS FET Q21 through a transfer gate MOS FET Q20 which receives the shift clock signal H1' at its gate. A half-bit circuit in the succeeding state provided in a pair with the foregoing half-bit circuit in the preceding stage is constituted by MOS FETs Q25, Q26, Q27, and Q28. The shift clock signal H1, is supplied to the drain of the input MOS FET Q25 in the succeeding stage, and the shift clock signal H2' is supplied to the gate of the MOS FET Q28. Although the invention is not specifically limited to this, a bootstrap capacitor C1 is connected between the gate and source of the input MOS FET Q21, and another bootstrap capacitor C2 is connected between the gate and source of the input MOS FET 25. Resetting MOS FETs Q45, Q46, Q47, Q48, Q49, Q50, etc., are respectively parallel connected to the corresponding MOS FETs Q23, Q27, Q31, Q35, Q39, Q43, etc. The initial signal IN is commonly supplied to the respective gates of those MOS FETs Q45, Q46, Q47, Q48, Q49, Q50, etc.

Each pair of the MOS FETs Q23 and Q24, Q27 and Q28, Q45 and Q46, etc., each connected to the earth potential Vss of the circuit, can be formed in an independent P-type well region in order to perform an initializing operation immediately after the turn-on of a power source, although the invention is, of course, not limited to this. That is, the MOS FETs of N channel type constituting the shift register are formed in a P-type well region separated from the region where the MOS FETs of N channel type are formed to constitute the picture element array LED of FIG. 1.

Thus, the circuit units for one bit constituted by the foregoing pair of half-bit circuits are cascade connected to thereby constitute the horizontal shift register HSR. In this embodiment, output signals corresponding to horizontal scanning lines HS1, HS2, etc., are generated successively from the circuit in the second stage.

The vertical shift register VSR is arranged in the same manner as the horizontal shift register HSR by using the same circuit elements except that the clock signals supplied thereto are different from those supplied to the horizontal shift register HSR.

Figure 4:
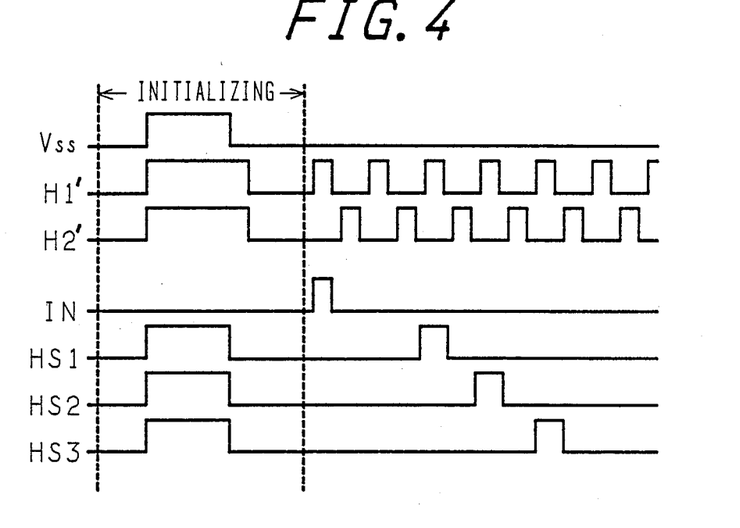
FIG. 4 is a timing chart for explaining the operation of the horizontal shift register of FIG. 3.

Next, referring to the timing chart of FIG. 4, the operation of the horizontal shift register HSR in this embodiment will be described.

The earth potential Vss of the circuit of the horizontal shift register HSR is changed to "High" so as to be the same as a source voltage upon the initialization immediately after the turn-on of the power source. At this time, in order to prevent the respective sources of the MOS FETs Q23, Q24, etc., from being forward-biased with respect to the substrate (the well region), the P-type well region in which those MOS FET Q23, Q24, etc., are formed is made "High" to be the same as the source voltage. Further, the shift clock signals H1' and H2' are made "High". As a result, upon the initialization immediately after the turn-on of the power source and, although not specifically limited, during the horizontal flyback time, the MOS FETs Q21, Q23, and Q24 are put in the on-state, so that the respective output signals from the half-bit circuits are made "High" by the clock signals H1' and H2' and the level at the terminal Vss which is put in the "High" state. Thus, a reset operation of a signal line, that is, a reset operation (a precharge operation) of a false signal on a signal line, is performed by the "High" state of the output signals corresponding to the horizontal scanning lines HS1, HS2, HS3, etc.

Next, when the level at the terminal Vss is made "Low" to be the same as the earth potential of the circuit, all the output signals corresponding to the horizontal scanning lines HS1, HS2, Hs3, etc., are made "Low" by the MOS FETs Q24, Q28, etc., which are kept in the on-state. Nest, when the signals H1' and H2' kept in the "High" state are made "Low", all the MOS FETs constituting the horizontal shift register HSR are made to be in the off-state. In such an initial state, the input signal IN is made "High" in synchronism with the "High" level of the shift clock signal H1' prior to the selection operation of horizontal scanning of the horizontal shift register HSR. As a result, the "High" level is transferred to the gate of the input MOS FET Q21 through the MOS FET Q20. At that time, the resetting MOS FETs Q45, Q46, Q47, Q48, Q49, Q50, etc., except the capacitor C1.

Next, when the clock signal H2' is made "High", the "High" level of this clock signal H2' is made "High", the "High" level of this clock signal H2' is transferred to the source of the MOS FET Q21 through the MOS FET Q21. At this time, the gate potential of the MOS FET Q21 is made up by a gate capacity between the gate and channel of the MOS FET Q21 and the bootstrap capacity C1, so that the "High" level of the clock signal H2' is transferred to the source side of the MOS FET Q21 without any level loss due to the threshold voltage of the MOS FET Q21. At this time, the MOS FET Q20 is kept in the off-state by the "Low" level of the clock signal H1', so that the boosted gate voltage of the MOS FET Q21 is never discharged to the input signal IN side. The "High" level of the source of this MOS FET Q25 in the succeeding stage through the diode-connection MOS FET Q22.

Next, when the clock signal H1' is made "High" after the clock signal H2' has been made "Low", the "High" level of the clock signal H1' is transferred by the operation as described above to the circuit in the next stage through the input MOS FET Q25 in the succeeding state. At this time, the capacitor C1 in the circuit in the first stage is reset to be "Low" by the "Low" level transmitted through the MOS FET Q24 which is made to be in the on-state by the "High" level of the clock signal H1' as well the "Low" level of the input signal IN. Thus, the output of the circuit in the preceding stage is made "Low", however, the boosted gate voltage of the input MOS FET Q25 in the circuit in the succeeding stage never disappears because the output of the circuit in the preceding stage is connected to the input terminal of the circuit in the succeeding stage through the diode-connection MOS FET Q22. Thus, the shift operation for one bit is performed on the basis of the clock signals H1' and H2'.

Thereafter, by repetition of the operation as described above, selection signals are successively generated in synchronism with the next shift clock signals H1' and H2' so as to be successively supplied to the first horizontal scanning line HS1, et seq. That is, the respective selection signals to be supplied to the horizontal scanning lines HS1, HS2, etc., shown by say of example, are successively made "High" in synchronism with the "High" level of the clock signal H1', and successively made "Low" in synchronism with the "High" level of the clock signal H2'.

In the case where such a shift register having a dynamic arrangement in this embodiment is utilized, if the shift operation of the shift register is interrupted, a selection signal remains in the interrupted bit stage. Therefore, the foregoing vertical shift register VSR is caused to completely carry out its shift operation to the final stage by using the horizontal clock signals as described above to thereby form an initial state rapidly. Further, compulsory resetting may be effected by making the input signal IN and the clock signals H1' and H2' "High" after the reading operation all over the valid lines to the N-th one has been executed.

The effects obtainable from the foregoing embodiment are as follows:

(1) It is possible to obtain such an effect that in the solid state image pickup apparatus comprising horizontal and vertical shift registers for reading signals from photoelectric conversion elements arranged in a matrix, clock signals made to have a high frequency are supplied to the vertical shift register so as to substantially omit scanning for signal reading lines to be made invalid of all the signal reading lines corresponding to the respective outputs of the vertical shift register in the reading operation for those invalid signal reading lines, so that vertical scanning of the invalid signal reading lines can be ended rapidly. The signal reading operation for the valid signal reading lines, on the other hand, can be executed at a high speeds.

(2) It is possible to obtain such an advantage that, horizontal clock signals are utilized for the vertical scanning of the invalid signal reading lines. Thus vertical scanning of the invalid signal reading lines can be completed at a high speed without using any special clock signal.

(3) It is possible to obtain such an effect that horizontal clock signals are utilized for the vertical scanning of the invalid signal reading lines, so that the vertical scanning of the invalid signal reading lines can be completed at a high speed without using any special clock signal. Therefore, a simple dynamic circuit can be utilized as it is as the vertical shift register.

(4) It is possible to obtain such an effect that, owing to the effects as described above in the items (1) and (2), a solid state image pickup apparatus for a television or a picture element array formed to have a relatively large number of lines can be used as it is to obtain an apparatus for recognition of various patterns requiring a different number of signal lines. Therefore, mass productivity can be improved.

(5) Finally, it is possible to obtain such an effect that, a program counter circuit or the like is used so that the number of valid lines can be desiredly set.

Although the present invention attained by inventors of this application has been specifically described with respect to an embodiment thereof, the present invention is not limited to the foregoing embodiment, but, of course, can be modified in various ways without departing from the spirit or scope of the present invention. For example, in the circuit in the embodiment of FIG. 1, as the clock signals for use for performing the shift operation of the vertical shift register with respect to the invalid lines at a high speed, it is not limited to use the horizontal clock signals. On the contrary, any other timing signals existing in the system may be utilized. Further, the number of valid lines may be determined by selectively cutting fuse means constituted by a polysilicon layer or the like, or may be determined by a master slicing system. Moreover, the solid state image pickup apparatus MID may be formed on a P-type semiconductor substrate.

The solid state image pickup apparatus according to the present invention has a wide use.

The main effect obtained by the representative solid state image pickup apparatus according to the above embodiment 1 may be summarized as follows. That is, in the solid state image pickup apparatus comprising horizontal and vertical shift registers for reading signals from photoelectric conversion elements arranged in a matrix, clock signals made to have a high frequency are supplied to the vertical shift register so as to substantially omit scanning for signal reading lines corresponding to the respective outputs of the vertical shift register in the reading operation for those invalid signal reading lines, so that vertical scanning of the invalid signal reading lines can be ended at a high speed.

Embodiment 2

Next, another embodiment of the present invention will be described with reference to FIGS. 5 to 7.

Figure 5:
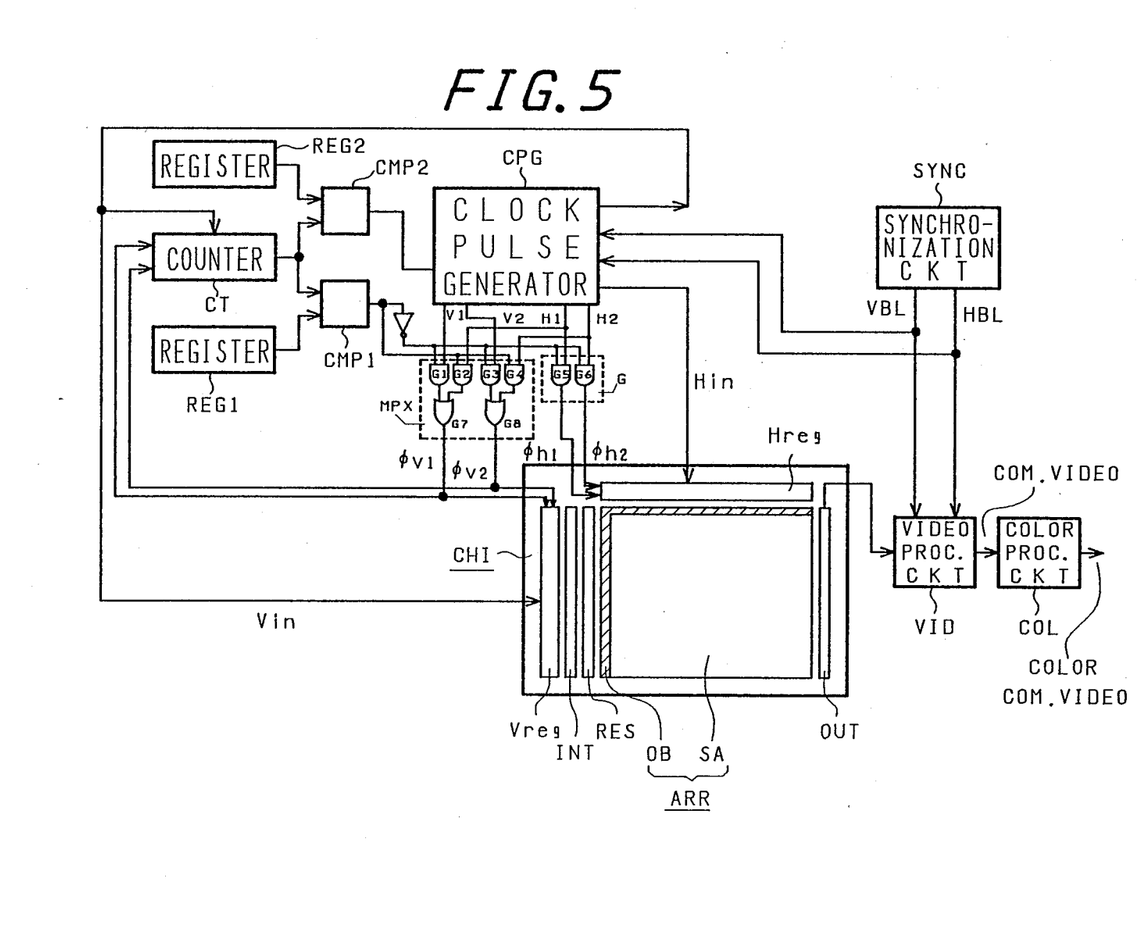
FIG. 5 is a block diagram showing another embodiment of the present invention.

FIG. 5 is a block diagram showing another embodiment of the solid state image pickup apparatus according to the present invention. In FIG. 5, a solid state image pickup chip CHI is provided corresponding to the MID of FIG. 1. At the center of chip CHI is provided a photo-diode array ARR in which a plurality of cells (or picture elements) are arranged in a matrix shape.

The photo-diodes array ARR is composed of a light receiving part SA and an optical black unit OB. The light receiving part SA is so constructed that it can convert an optical signal incident through an optical lens into electric charges to store them. The optical black unit OB is so constructed as to form a reference value (or an optical black level) for correcting noises due to dark current component.

At the left-hand side of the photo-diodes array ARR, there are disposed a horizontal fly-back (or retrace) period resetting unit RES, an interlace scanning control unit INT, and a vertical scanning shift register unit (or a vertical scanning circuit) Vreg. A horizontal scanning shift register unit (or a horizontal scanning circuit) Hreg is disposed at the upper side, and an output circuit (or a read circuit) OUT is disposed at the right-hand side.

Figure 7:
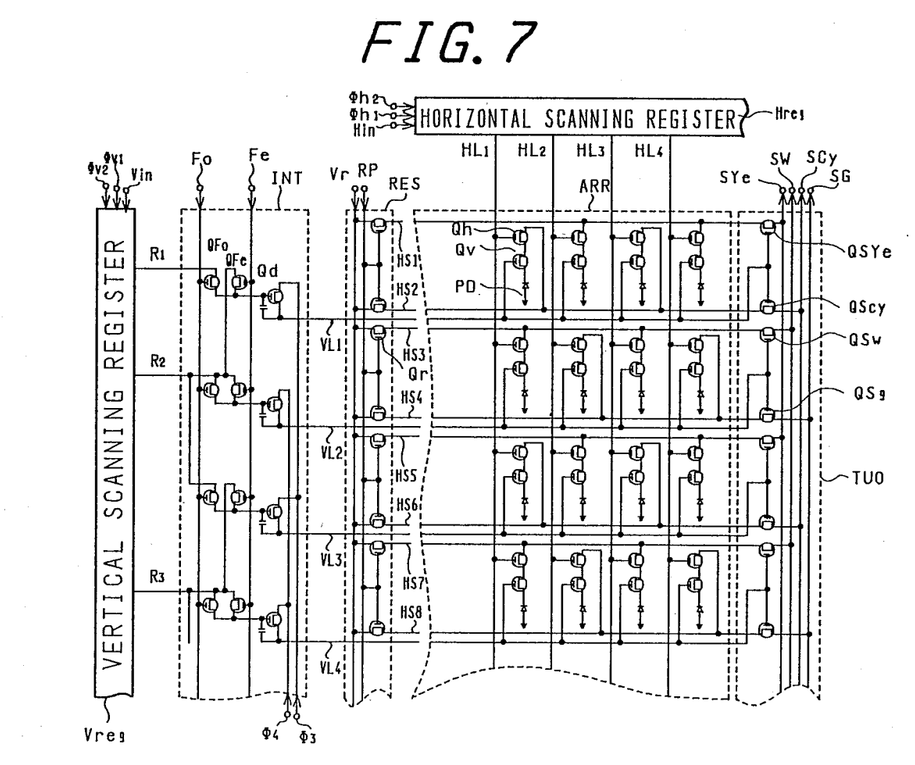
FIG. 7 is an internal equivalent circuit diagram of the solid-state imaging chip CHI.

As shown in FIG. 7, the photo-diodes are arranged at the individual crossing portions of vertical scanning lines VL1, VL2, ---, and so on, horizontal scanning lines HL1, HL2, ---, and so on, and output signal lines HS1, HS2, ---, and so on. The vertical scanning lines VL extend in a row direction and are arranged in plurality in a column direction. The horizontal scanning lines HL extend in a column direction and are arranged in plurality in a row direction. The output signal lines HS extend in the same row direction as that of the vertical scanning lines VL and are arranged in plurality in the column direction.

One of the aforementioned picture elements is composed of a photoelectric conversion element (or a photo-diodes) PD, and a horizontal switch MOS Qh and a vertical switch MOS Qv for accessing (or calling) the photoelectrically converted output of the photo-diodes PD. The horizontal switch MOS Qh has its one semiconductor region of the vertical switch MOS Qv so that they are connected in series. The photoelectric conversion element PD is connected with the other semiconductor region of the vertical switch MOS Qv1.

The gate electrodes of the horizontal switch MOS Qh of the plural solid state image pickup elements, which are arranged in the column direction, are connected with one of the horizontal scanning lines HL. This horizontal scanning line HL is connected with the horizontal scanning shift register HL arranged in the row direction in response to an input signal Hin and clock signals $\phi h_1$ and $\phi h_2$ to thereby select the picture elements in the row direction.

The gate electrodes of the vertical switches MOS Qv of the plural picture elements, which are arranged in the row direction, are connected with one of the vertical scanning lines VL. One end of the vertical scanning line VL is connected through the interlace scanning control unit INT with the vertical scanning shift register unit Vreg. This vertical scanning shift register unit Vreg is so constructed as to output select signals $R_1$, $R_2$, ---, and so on for sequentially scanning the plural vertical scanning lines VL, which are arranged in the column direction, to the interlace scanning control unit INT in response to the input signal Vin and the clock signals $\phi h_1$ and $\phi h_2$.

The interlace scanning control unit INT is so constructed as to control a switch MOS QFe or QFo in response to a field select signal Fe or Fo to thereby select a driving MOS Qd for transmitting a select signal R. The driving MOS Qd is equipped with a bootstrap capacitor between its gate electrode and one semiconductor region (or the vertical scanning line VL). A vertical scanning signal $\phi_3$ or $\phi_4$ is applied to the other semiconductor region of the driving MOS Qd. More specifically, the vertical scanning signal $\phi_3$ or $\phi_4$ is applied to the vertical scanning line VL by the driving MOS Qd on the basis of the select signal R. The driving MOS Qd can apply the vertical scanning signal $\phi_3$ or $\phi_4$ to the vertical scanning line VL by the aforementioned bootstrap capacitor without any voltage drop corresponding to a threshold voltage.

The interlace scanning control unit INT is so constructed as to read two rows simultaneously. More specifically, the interlace scanning control unit INT first selects the two vertical scanning lines VL (e.g., VL1 and VL2, or VL3 or VL4) in the adjoining fields of odd numbers in response to a field select signal F. Next, the interlace scanning control unit INT performs another selection by changing the combination of the two vertical scanning lines VL (e.g., VL2 and VL3, or VL4 and VL5) in response to another field select signal F.

The other ends of the vertical scanning lines FL are connected with the gate electrodes of output controlling MOSs QSye, Qscy, QSw and QSg of the output circuit OUT. Each of these output controlling MOSs QS is so constructed as to connect one end of each of output signal lines HS and each of output lines SYe, SCy, SW and SG of individual colors of the output circuit OUT.

The output signals lines HS are connected with the other semiconductor (or drain) regions of the horizontal switch MOSs Qh of the plural solid state image pickup elements arranged in the two direction. The other ends of the output signal lines HS are connected with the resetting output line Vr through resetting MOSs Qr of the horizontal fly-back period resetting unit RES. The resetting MOSs Qr have their gate electrodes connected to and controlled by a reset signal line RP. The horizontal fly-back period resetting unit RES is so constructed as to reset the false signals which are stored in a horizontal scanning period.

Next, returning to FIG. 5, the overall structure of the present embodiment 2 will be described in the following.

A counter CT counts the number of input clock signals such as two-phase vertical scanning clock signals $\phi v_1$ and $\phi v_2$ (which correspond to the clock signals H1' and H2' of FIG. 3) to be applied to the vertical scanning register Vreg of the solid state image pickup chip CHI and stores what vertical scanning line VL (of FIG. 7) is being scanned. A reset/start timing signal Vin (which corresponds to the input signal IN of FIG. 3) instructs the reset and scanning start of the vertical scanning register Vreg and resets the counter CT.

In the example 1, the description has been directed to the example in which the former region of each field is vertically scanned at a high speed whereas the latter region is made a valid pickup one. In the present embodiment, on the contrary, a method of validating a central region but invalidating the before and after regions will be described in the following.

The register REG1 stores a constant vi for invalidating the former region of vertical scanning of each field. In case the number of the valid vertical scanning lines to be read by the normal operation is set at 480, for example, and in case the former half is made an invalid region, the register REG1 in the interlace scanning system is set with the half value 120 of the valid scanning lines 240 of an odd (or even) number of fields. A comparator CMP1 compares and stores the relation between the levels of the contents of the register REG1 and the counter CT so that the logic is inverted to "0" at a next timing in case the contents of the two become equal. Since the gates G2 and G4 are open until the value of the counter CT takes 121, the vertical scanning register Vreg is driven at a high speed by the horizontal scanning clock signals H1 and H2 and after the 122-th vertical scanning by the ordinary vertical scanning clock signals V1 and V2.

The register REG2 stores a constant vj for invalidating the latter region of the vertical scanning of each field. In case the latter 4/4 is made an invalid region, for example, the register REG1 in the interlace system is set with the value 180, i.e., thirds quarters of the valid scanning lines 240 on an odd (or even) number of fields. A comparator CMP2 compares and stores the relation between the levels of the contents of the register REG2 and the counter CT so that its output is inverted at a next timing when the contents of the two become equal. In response to this output, the clock generation circuit CPG activates the reset/start vertical clock signal Vin. As a result, the vertical scanning of the photo-diodes array ARR is interrupted at the 240-th so that the vertical scanning shift register Vreg (as shown in FIG. 3, where the H1' and H2' are replaced by the V1 and V2, respectively, and the IN is replaced by Vin) and the counter CT are reset. After this, the aforementioned high-speed scanning—normal scanning—interruption are repeated.

Figure 8A:
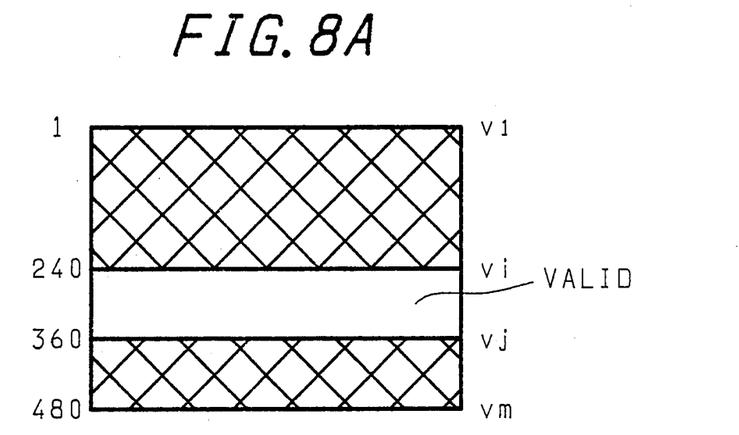
FIG. 8A and FIG. 8B are drawings for illustrating window function.

Thus, by performing and interrupting the vertical scanning of the image pickup device CHI at a high speed, the image pickup is enabled to have a window function, as indicated by a white field VALID of FIG. 8A.

Figure 6:
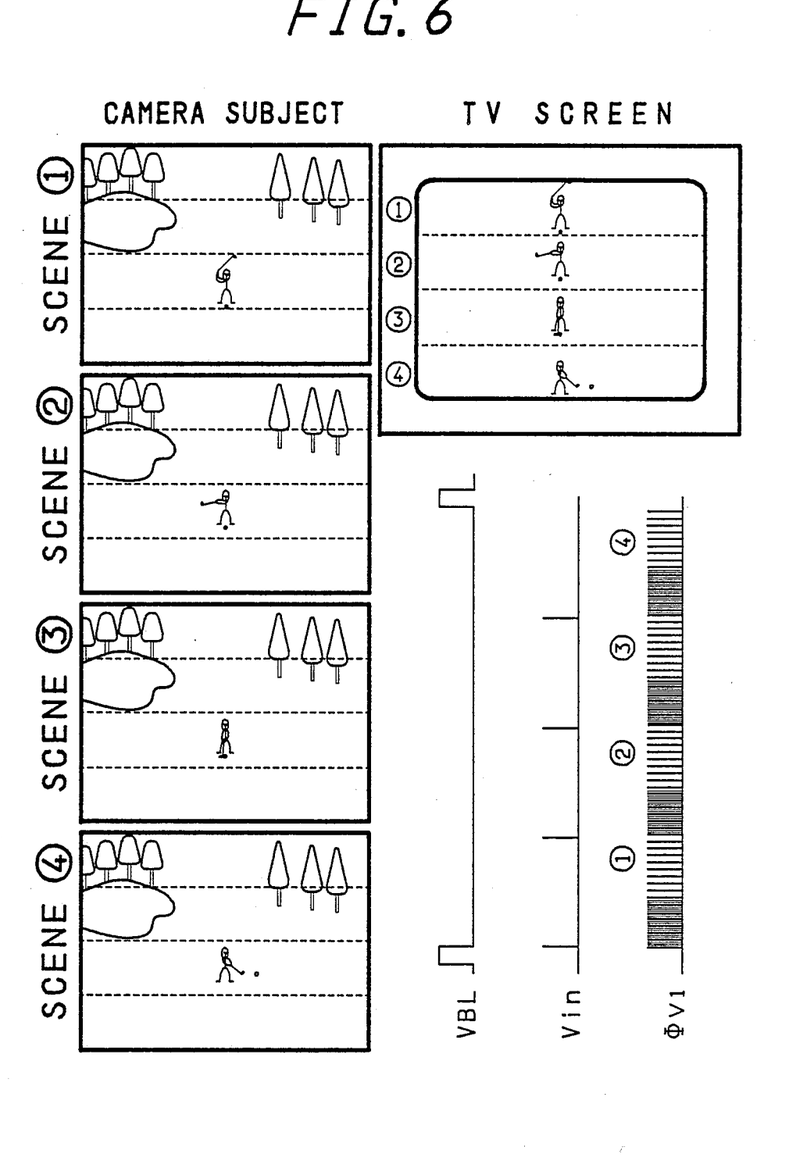
FIG. 6 is a drawing of camera scene, a TV screen and a timing chart for illustrating the operation of the-above embodiment of FIG. 5.

FIG. 6 presents diagrams for explaining that window function of the image pickup by providing correspondences between the scenes (1) to (4) of an object and the TV frame. In FIG. 6, the scenes (1) to (4) catch a motion object in a common field of view by an image pickup camera. The scene (1) presents the object for a time period of ¼ of one field; the scene (2) presents the object for a subsequent ¼ period; the scene (3) presents the object of a subsequent ¼ period; and the scene (4) presents the object of the last ¼ period. For these respective scenes, the image pickup device CHI is driven to give the window function shown in FIG. 8A so that only the third region (in which a person is playing the golf) from the four vertical divisions of the object is taken out as the valid image information from the output circuit OUT (of FIG. 5) of the image pickup device CHI.

Returning to FIG. 5, the image information from the output circuit OUT of the image pickup device CHI is sent to a video signal processing circuit VID. In this video signal processing circuit VID, the horizontal and vertical synchronizing clock signals (although not shown) for a TV receiver or video tape recorder are added to the image pickup output from the output circuit OUT with reference to horizontal and vertical blanking clock signals HBL and VBL to reproduce a pedestal level in a direct current to thereby form composite video signals COM and VIDEO. A color signal processing circuit COL is for the color video and has a color encoder or the like. The composite color video signals COLOR COM. VIDEO from the color signal processing circuit COL are sent to the monitor TV receiver of a TV camera or a video tape recorder (VTR).

The image pickup camera and the TV receiver (or VTR) are synchronized by the horizontal and vertical blanking clock signals HBL and VBL coming from a synchronizing signal generating circuit SYNC so that the clock signal generation circuit CPG of the image pickup camera generates the two-phase horizontal and vertical scanning clock signals H1, H2, V1 and V2 for the image pickup device CHI on the basis of those blanking clock signals.

The scanning of the image pickup device CHI in case the aforementioned window function is set will be described with reference to the time chart of FIG. 6 by using the vertical scanning clock signal $\phi v_1$ as a representative. In the former half of each field in the vertical direction, the scanning clock signal $\phi v_1$ to be applied to the vertical scanning register Vreg (of FIG. 5) takes a frequency as high as that of the horizontal scanning clock signal H1 so that it takes the same frequency as that of the ordinary vertical scanning clock signal V1 for the period of 2/4 to 3/4 of each field and has its scanning interrupted in response to the vertical scanning reset/start clock signal Vin for the remaining period of ¾ to 4/4 of each period. As a result, in the ordinary TV frame, the field of view of ¼ of the scenes (1) to (4) of the object is vertically scanned totally four times with the ordinary frequency in the image pickup device for one field (or for one period of the vertical blanking clock signal VBL, as shown in FIG. 6) so that only the valid region VALID of FIG. 8A is instantly projected downward on the TV frame. If, in this case, the image output picked up is once recorded on the VTR, the TV frame of FIG. 6 is obtained as a still image when the pause switch of the VTR is depressed.

The following effects can be attained with the construction described above:

(i) The field of image pickup view of an object can be made like a window with the simple structure, and any image processing therefor can be omitted.

(ii) As seen from FIG. 6, the vertical window can be picked up, in case it is ¼, for example, with a repetitive frame period as large by about ¼ times as the ordinary scanning period. As a result, the image pickup operation can be performed in this case at a speed of about four time so that a high-speed image pickup can be accomplished.

(iii) Since only the windowed portion is substantially taken out as the image pickup information, this information can be a compressed one to reduce the capacities of the magnetic tape or the image processing analog memory.

Figure 8B:
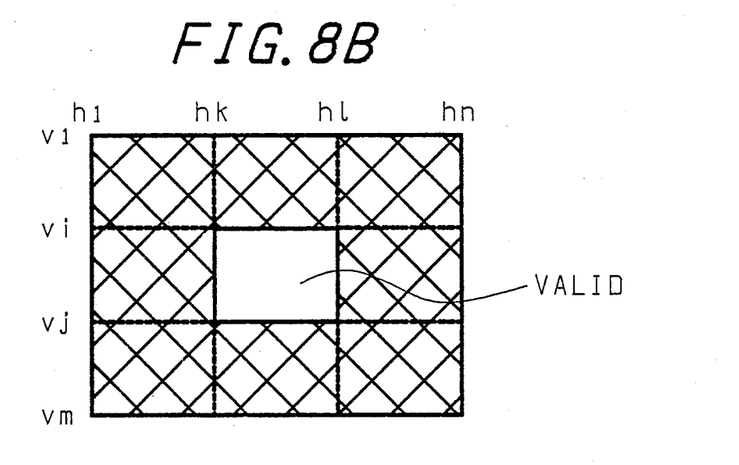

Although the present invention has been described in connection with the embodiment thereof, it can be practised in the following modified forms;

(i) The window may be not only in the vertical direction but also in the horizontal direction, as shown in FIG. 8B. In this modification, for the horizontal scanning clock signals $\phi h_1$ and $\phi h_2$, a multiplexer MPX, constant registers REG1 and REG2 and a counter CT like those of the vertical scanning circuit have to be provided to generate clock signals of higher frequencies than the ordinary horizontal scanning clock signals H1 and H2 by a clock generation circuit CPG.

(ii) The constant storing registers REG1 and REG2 shown in FIG. 5 may be constructed of mechanically operable switches or the like to be operated by the user.

(iii) In connection with the modification of the horizontal window described in the above item (i), it is possible to perform the horizontal scanning with an ordinary scanning frequency and to cut the unnecessary horizontal output by the video signal processing circuit VID of the like. In this modification, any frequency higher than the ordinary horizontal scanning clock signal can be omitted.

(iv) In connection with the scanning register shown in FIG. 3, a setting transistor capable of freely setting an initial value is disposed at each step to start the scanning suddenly from the vertical line of the (vi+1)-th row shown in FIG. 8A on the basis of that initial value in place of the aforementioned high-speed scanning.

(v) In the embodiment having been described with reference to FIG. 5 and the time chart of FIG. 6, the high-speed scanning portion of the former half (V1 to vi) of the field of each field by the horizontal clock signals H1 and H2 corresponds (although exaggerated in the time chart of FIG. 6) to one vertical line in the actual TV frame so that four vertical lines are not projected (or omitted) at the head of each of the scenes (1) to (4), although cannot be visually grasped in the actual TV frame.

Figure 9:
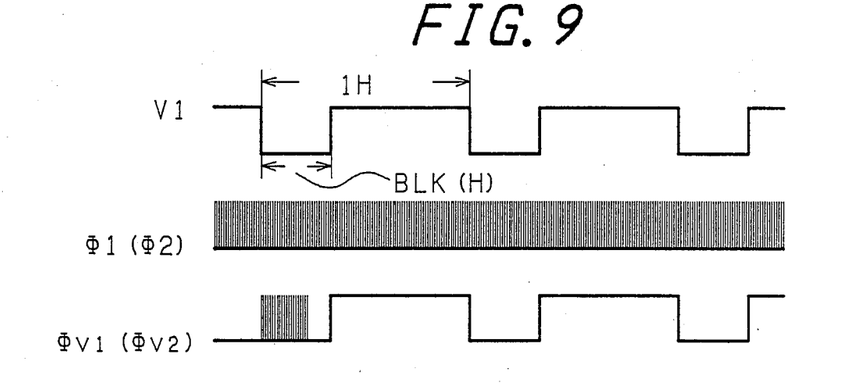
FIG. 9 is a timing chart for illustrating a modified embodiment of FIG. 5.

In order to prevent this difficulty, the two-phase clock signals $\phi_1$ and $\phi_2$ having frequencies H1, as shown in the time chart of FIG. 9, may be used and applied to the gates G2 and G4 or FIG. 5 in place of the two-phase horizontal scanning clock signals H1 and H2. The frequencies of those high-frequency clock pulses $\phi_1$ and $\phi_2$ may be so selected at a level (e.g., 25 MHz or higher) that 240 clock signals may be in the horizontal fly-back period BLK (H) of the vertical scanning clock signal V1 as in the aforementioned example of the number of vertical lines. With the modified structure described above, the high-speed scanning is performed within the horizontal fly-back period, no matter what range the window might be set, so that any unnecessary high-speed photoelectric conversion output disappears from the TV frame.

(vi) Incidentally, the optical black portion OB necessary for setting the black (or pedestal) level may be read out at first of each field independently of the window process described hereinabove.

We claim:

1. A solid-state imaging system comprising: a plurality of photo-electric converting elements arrayed in a plurality of rows and columns, a vertical scanning circuit for accessing predetermined ones of said elements in every one or more rows in a predetermined order, a horizontal scanning circuit for accessing predetermined ones of said elements in every column in a predetermined order, an output terminal, an output circuit for serially deriving the converted electrical signal to said output terminal in cooperation with said vertical and horizontal scanning circuits, and an exchanging circuit for making the scanning rate of said vertical scanning circuit normal in a first mode and equal to that of said horizontal scanning circuit in said second mode.

2. A solid-state imaging system comprising: a plurality of photo-electric converting elements arrayed in a plurality of rows and columns, a vertical scanning circuit for accessing predetermined ones of said elements in every one or more rows in a predetermined order, a horizontal scanning circuit for accessing predetermined ones of said elements in every column in a predetermined order, an output terminal, an output circuit for serially deriving the converted electrical signal to said output terminal in cooperation with said vertical and horizontal scanning circuits, and an exchanging circuit for making the scanning rate of said vertical scanning circuit normal in a first mode and in a second mode finishing the scanning of predetermined ones of said elements in a certain range of said rows within the horizontal retrace period by using a scanning pulse with a frequency higher than that of said horizontal scanning circuit.

3. A solid-state imaging system comprising: a plurality of photo-electric converting elements arrayed in horizontal and vertical directions, an output terminal, a horizontal accessing circuit for deriving the converted electrical signal from predetermined ones of said elements to said output terminal in a horizontal scanning order, a vertical accessing circuit for deriving the converted electrical signal from predetermined ones of said elements to said output terminal in a vertical scanning order, and a scanning control means the output of which is coupled to said vertical and/or horizontal accessing circuit, said means being operable in a certain vertical range per one vertical and/or horizontal scanning field to omit the vertical and/or horizontal scanning.

4. A solid-state imaging system comprising: a plurality of photo-electric converting elements arrayed in horizontal and vertical directions, an output terminal, a horizontal accessing circuit for deriving the converted electrical signal from predetermined ones of said elements to said output terminal in a horizontal scanning order, a vertical accessing circuit for deriving the converted electrical signal from predetermined ones of said elements to said output terminal in a vertical scanning order, and a scanning control means, the output of which is coupled to said vertical and/or horizontal accessing circuit, said means being operable in a former vertical and/or horizontal range per one vertical and/or horizontal scanning field to make the scanning rate high, in the middle vertical and/or horizontal range to make the scanning rate normal so as to obtain a valid converted electrical signal at said output terminal, and in the latter vertical and/or horizontal range to omit the vertical and/or horizontal scanning.

* * * * *

UNITED STATES PATENT AND TRADEMARK OFFICE
CERTIFICATE OF CORRECTION

PATENT NO. : 4,841,369
DATED : June 20, 1989
INVENTOR(S) : S. Nishizawa et al

It is certified that error appears in the above-indentified patent and that said Letters Patent is hereby corrected as shown below:

In the Drawings:

Sheet 1, Fig. 1, "Clok Pulse Generator" should read "Clock Pulse Generator".

On the title page, Item [73]: Assignee, should be inserted and should read --Hitachi, Ltd., Japan--.

Signed and Sealed this

Nineteenth Day of April, 1994

*Attest:*

BRUCE LEHMAN

*Attesting Officer*     Commissioner of Patents and Trademarks